J. LARSON & J. A. TOLLBOM.
LIGHT BUOY FOR ATTRACTING FISH.
APPLICATION FILED NOV. 21, 1917.
1,263,077.
Patented Apr. 16, 1918.
2 SHEETS—SHEET 1.
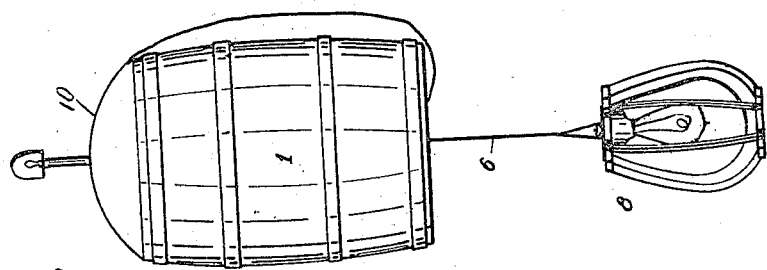
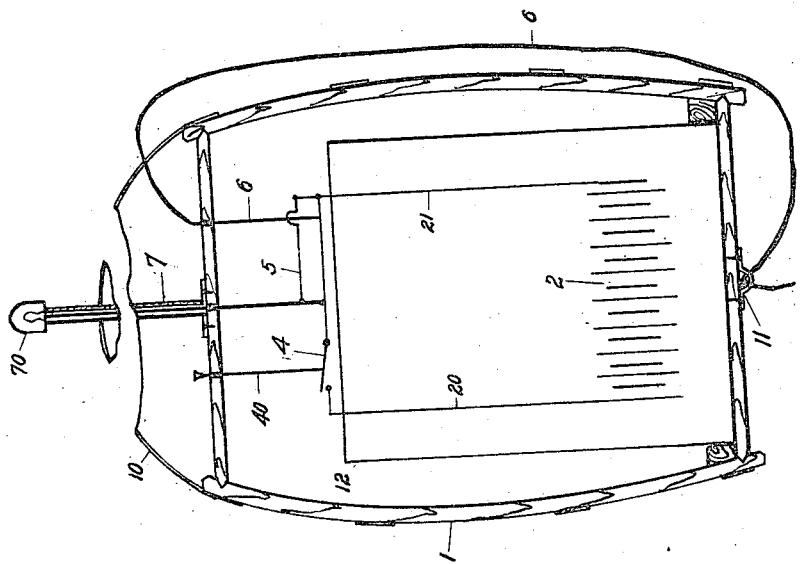
Inventor
John Larson
John A Tollbom
By Henry L. Reynolds.
Attorney

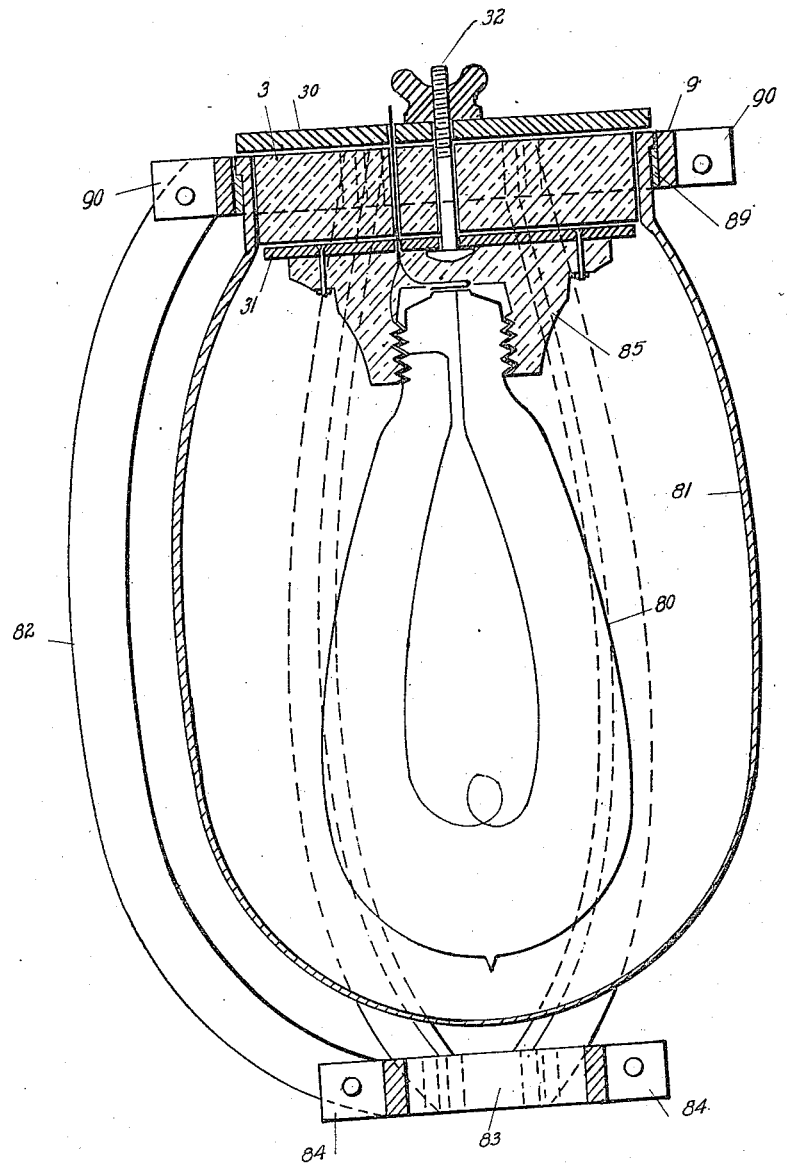

UNITED STATES PATENT OFFICE.

JOHN LARSON AND JOHN A. TOLLBOM, OF SEATTLE, WASHINGTON.

LIGHT-BUOY FOR ATTRACTING FISH.

1,263,077.  Specification of Letters Patent.  Patented Apr. 16, 1918.

Application filed November 21, 1917. Serial No. 203,288.

*To all whom it may concern:*

Be it known that we, JOHN LARSON, subject of the King of Sweden, (who has taken out his first papers for United States citizenship,) and JOHN A. TOLLBOM, a citizen of the United States, and residents of the city of Seattle, county of King, and State of Washington, have invented certain new and useful Improvements in Light-Buoys for Attracting Fish, of which the following is a specification.

Our invention relates to a buoy which carries a light suspended for the purpose of attracting fish.

The object of our invention is to provide means whereby a light may be suspended in water frequented by fish and left for a period of time so that fish will be attracted thereto, thus making it more certain of being able to make a good catch.

Our invention comprises the parts and combinations of parts which are hereinafter defined by the claims.

In the accompanying drawings we have shown the type of construction which we now prefer to use.

Figure 1 is a vertical section through the buoy.

Fig. 2 is a side view of the buoy with the light suspended therefrom.

Fig. 3 is a vertical section through the light apparatus.

It is a well known fact that lights attract fish. It is, therefore, our desire to provide a buoy with an electric lamp and a source of supply of current sufficient to operate this lamp for a reasonable time and to so mount this that the buoy may be placed out in water frequented by fish, whereupon the fish would be attracted to its vicinity and a net may then be cast about the fish to catch them.

The buoy may be made of any material found suitable. As herein illustrated, it is supposed to be made in the form of a cask or barrel, out of wood. Within this barrel 1 is placed a box 12, preferably of metal, and capable of being sealed tightly to prevent the possibility of water getting therein. Within this box is placed a storage battery 2, herein represented by the conventional symbol. From this battery, positive and negative leads, 20 and 21, extend to the top of the box and are joined in a cable 6 which extends through the upper head of the barrel. A switch 4 is placed in one of these leads and is operated by means of a rod 40, which passes through the upper head of the buoy.

A shunt circuit 5 passes upward through a pipe 7 which extends upward from the buoy and has a small electric light 70 thereon, the same acting as a beacon to enable the buoy to be found readily after dark. We prefer to cover the upper end of the buoy with a cap, as 10, which cap should be removed to give free access to the switch operating rod 40.

The cable 6 depends over the side of the buoy and is supported centrally of the bottom of the buoy as by ring or staple 11, and the lamp 8 is thus suspended beneath the buoy. The depth at which the lamp is to be suspended is controlled by the length of the cable and may be made any distance found suitable.

The lamp 8 has a lamp bulb 80 of any ordinary or suitable construction, which is inclosed within a bell or globe 81, the latter being of transparent or translucent material. The socket base 85 is secured to a metal plate 31 and a packing disk 3 of compressible material, as soft rubber, is placed between the plate 31 and the plate 30, the latter plate being preferably of a size to overlap the wide mouth of the bell 81. The mouth of this bell is made of such size as to permit ready passage of the electric light bulb 80. A bolt 32 passing centrally through both plates 30 and 31 and the rubber disk 3, permits compression of the disk 3 such that its outer edges will be forced outward into intimate contact with the inner wall of the mouth of the bell 81, thus insuring a tight joint.

We have shown a protective screen or guard for this light bell, the same consisting of a metal ring 9, which embraces the neck of the bell 81 and which is provided with flanges 90 to which the guard bars 82 are secured. A ring 83 of corresponding construction, provided with flanges 84, is placed at the lower end of the bell and has the lower ends of the guard rods 82 secured thereto.

In case the bell should become broken, it may be removed and replaced by loosening a couple of these rods. In order to strengthen the mouth of the bell against the outward pressure of the disk 3, in case this is pretty well squeezed together, and also to hold the disk in place within the ring 9, the opening in the ring 9 is made a loose fit for the neck of the bell and the space between them is then filled with some material which can be poured in place, such for instance as plaster of Paris. This reinforces the neck of the bell against the pressure secured by the disk 3 and holds the parts secured together in place.

In using our device the same is placed overboard from a boat at a point where it is desired to fish. The battery 2 should be charged sufficiently to operate the lamp for the time desired. The buoy is then left in place after turning the light on the suspended lamp and is left alone for whatever period of time is found to be sufficient or desirable. The net is then cast about the area of which the buoy is the center, and the fish which have been attracted by the light, are caught.

What we claim as our invention is:

1. A fishing buoy having an electric battery therein, a cable connected with said battery and passing through the upper end of the buoy, a lamp, means for supporting said cable from the lower end of the buoy and a lamp suspended by said cable beneath the buoy.

2. A buoy comprising a flotation chamber, an electric battery in said flotation chamber, a circuit switch in the same chamber, a switch operating rod passing through the upper end of the buoy, a cap covering the upper end of the buoy and said switch, a cable connected with the battery and passing outward through said upper end, and a lamp suspended by said cable beneath the buoy.

Signed at Seattle, Washington, this 15th day of November, 1917.

JOHN LARSON.
JOHN A. TOLLBOM.

Copies of this patent may be obtained for five cents each, by addressing the "Commissioner of Patents, Washington, D. C."